Patented Nov. 29, 1938

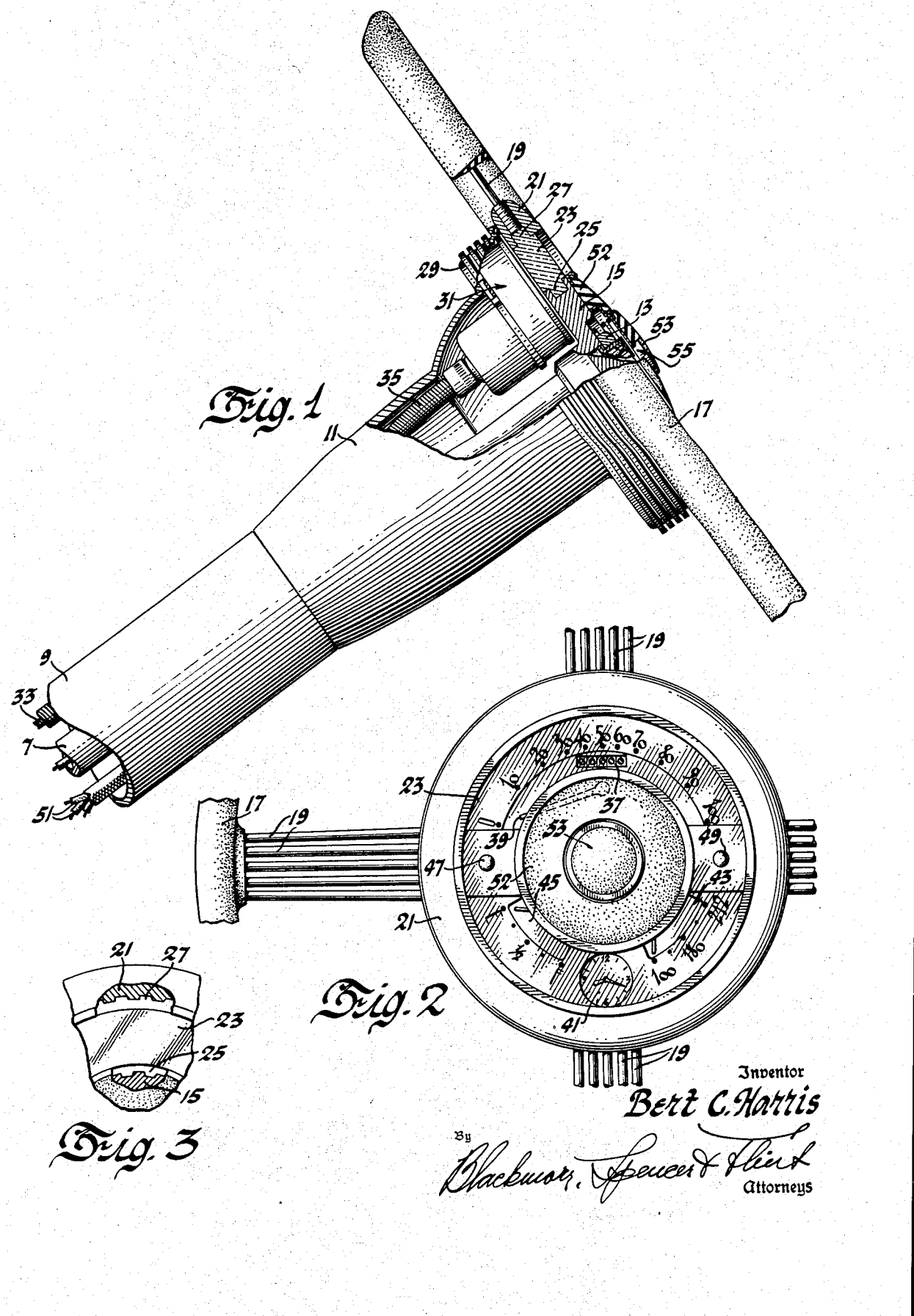

2,138,163

UNITED STATES PATENT OFFICE 2,138,163

STEERING WHEEL INSTRUMENT PANEL

Bert C. Harris, Lansing, Mich., assignor to General Motors Corporation, Detroit, Mich., a corporation of Delaware Application January 20, 1938, Serial No. 185,867

7 Claims. (Cl. 180—78)

This invention relates to an assembly of instruments for a motor vehicle.

An object of the invention is to assemble the several instruments in a location for convenient inspection.

Another object is to associate with an unconventional location of instruments a novel form of steering wheel, the novelty being constituted by a transparent torque transmitting annulus between the hub and the spokes and through which transparent annulus the several instruments are observed.

Other objects and advantages including pleasing appearance and economy in manufacture will be understood from the following description.

On the accompanying drawing:

Figure 1 is a side elevation of a steering column and steering wheel partly broken away to illustrate the invention.

Figure 2 is a plan view and

Figure 3 is a detail partly in section.

Numeral 7 is applied to the conventional steering post, rotation of which steers the vehicle. The post is housed within a hollow column 9 having an enlarged upper end 11. To the top of post 7 is secured by a nut 13 an inner hub 15 of a hand steering wheel. In addition to this hub the wheel includes a rim 17, a plurality of spokes 19, an outer hub 21 and an annulus of transparent material such as glass 23. The spokes are secured in any convenient way to the rim and outer hub as shown on the drawing.

The transparent annulus is anchored to the inner and outer hub members by inwardly directed lugs 25 and outwardly directed lugs 27 whereby the torque from the outer hub may be transmitted to the inner hub.

Adjacent and beneath the steering wheel the column is enlarged as at 29 to form a housing for mounting the several instruments which are used in connection with the operation of the motor vehicle. These instruments are distributed in a circle beneath the glass annulus and their indicating members are visible through the glass. The drawing shows a speedometer and odometer combination at 31. This instrument is operated by a conventional cable 33 within a flexible housing 35 extending through the steering column. Seen through the glass annulus are the speed indicating figures of the speedometer and the figures on the wheels 37 of the odometer. The pointer 39 is also visible through the glass.

In Figure 2 there is also seen a clock 41. The clock is diametrically opposite the speedometer and visible through the glass annulus. It is housed as is the speedometer within the enlarged top portion 29 of the steering column. A water temperature gauge 43 which needs no specific description is located beneath the glass annulus at one side of the clock and a gasoline gauge 45 is similarly located at the other side of the clock. Electric bulbs 47 and 49 are shown in diametrically opposite positions, these bulbs being intended to be illuminated, the one in the event of oil pump failure and the other to indicate a failure of the generator serving to charge the battery. In Figure 1 are also shown the electric cables 51 extending through the steering column and serving to operate the instruments.

Above the nut 13 is an ornamental closure. This closure may be made integral throughout but if preferred it may be divided to form an annular ring 52 and a disc 53, the latter being mounted for axial reciprocation to operate a horn button mechanism indicated by numeral 55.

The arrangement presents a pleasing appearance. The instruments are conveniently located for observation and are not obstructed by the spokes of the wheel as too frequently happens in the case of instruments mounted on the conventional panels.

I claim:

1. In a steering wheel, an inner part, an outer part, a transparent annulus connected to and between said parts through the instrumentality of which annulus torque is transmitted between said parts.

2. In combination, a steering post, a steering wheel secured to said post, said wheel including as a part thereof a torque transmitting transparent annulus, an instrument having indicia, said instrument being mounted below and observable through said annulus.

3. The invention defined by claim 2 together with a steering column surrounding said post, said instrument being housed within said column beneath said annulus.

4. In combination, a steering column having an enlarged upper end, a steering post within said column, a wheel secured to said post and extending across the upper end of said column, a plurality of instruments housed within said enlarged end and around said post, said wheel including a transparent torque transmitting annulus through which said instruments may be observed.

5. The invention defined by claim 4, together with means extending through said column for operating said instruments.

6. A steering wheel having an inner hub, an outer hub, a rim, a plurality of spokes connecting said rim and outer hub and a transparent torque transmitting annulus connected to said outer hub and inner hub whereby mechanisms beneath said annulus may be observed therethrough.

7. The invention defined by claim 6, together with a steering post connected to said wheel, a steering column surrounding said post, said mechanisms being housed between said column and post and beneath said annulus.

BERT C. HARRIS.